US012518064B2

(12) United States Patent
Okuno

(10) Patent No.: US 12,518,064 B2
(45) Date of Patent: Jan. 6, 2026

(54) INFORMATION PROCESSING APPARATUS FOR PROHIBITING CURRENT USER OF PRINTING DEVICE FROM ACCESSING USER INFORMATION FOR FORMER USER OF THE SAME PRINTING DEVICE

(71) Applicant: BROTHER KOGYO KABUSHIKI KAISHA, Nagoya (JP)

(72) Inventor: Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 263 days.

(21) Appl. No.: 17/935,702

(22) Filed: Sep. 27, 2022

(65) Prior Publication Data

US 2023/0102228 A1 Mar. 30, 2023

(30) Foreign Application Priority Data

Sep. 30, 2021 (JP) .................................. 2021-161718

(51) Int. Cl.
G06F 21/78 (2013.01)
G06F 3/12 (2006.01)
H04N 1/34 (2006.01)

(52) U.S. Cl.
CPC ............ G06F 21/78 (2013.01); G06F 3/1203 (2013.01); G06F 3/1231 (2013.01);
(Continued)

(58) Field of Classification Search
None
See application file for complete search history.

(56) References Cited

U.S. PATENT DOCUMENTS

2012/0044539 A1\* 2/2012 Yamaguchi .......... H04N 1/4433
358/1.16
2013/0070288 A1\* 3/2013 Muranaka ............. G06F 3/1204
358/1.15
(Continued)

FOREIGN PATENT DOCUMENTS

JP 2011113241 A 6/2011
JP 2012-44486 A 3/2012
(Continued)

OTHER PUBLICATIONS

Extended European Search Report dated Feb. 14, 2023 from corresponding European Patent Application No. 22197967.7.
(Continued)

*Primary Examiner* — Akwasi M Sarpong
*Assistant Examiner* — Pawan Dhingra
(74) *Attorney, Agent, or Firm* — Scully, Scott, Murphy & Presser, P.C.

(57) ABSTRACT

An information processing apparatus includes a controller configured to manage the printing device on the basis of user information of a corresponding user. The controller further performs: (a) acquiring individual information identifying the printing device; (b) acquiring initialization identification information used for determining whether an information initialization has been performed on a specific printing device identified by the individual information acquired in the (a) acquiring; (c) determining, on the basis of the individual information acquired in the (a) acquiring and the initialization identification information acquired in the (b) acquiring, whether the information initialization has been performed on the specific printing device along with transfer of ownership of the specific printing device from a first user to a second user; and (d) prohibiting, in response to determining in the (c) determining that the information initial-
(Continued)

ization has been performed, the second user from accessing the user information of the first user.

11 Claims, 10 Drawing Sheets

(52) U.S. Cl.
    CPC .......... *G06F 3/1238* (2013.01); *G06F 3/1285* (2013.01); *H04N 1/346* (2013.01); *G06F 2221/2143* (2013.01)

(56) References Cited

U.S. PATENT DOCUMENTS

| 2014/0185092 | A1* | 7/2014 | Takasu | H04N 1/00334 |
| | | | | 358/1.15 |
| 2014/0320883 | A1* | 10/2014 | Ichida | G06F 3/1238 |
| | | | | 358/1.14 |
| 2015/0015908 | A1* | 1/2015 | Tanaka | H04N 1/32106 |
| | | | | 358/1.14 |
| 2016/0105570 | A1* | 4/2016 | Katoh | G06F 3/1285 |
| | | | | 358/1.15 |
| 2018/0234840 | A1* | 8/2018 | Nakamura | H04W 48/16 |
| 2022/0006920 | A1* | 1/2022 | Mukai | H04N 1/0048 |

FOREIGN PATENT DOCUMENTS

| JP | 2019129342 A | 8/2019 |
| JP | 2020140223 A | 9/2020 |

OTHER PUBLICATIONS

Mutemwa, M. et al., "Cyber Security Threats and Mitigation Techniques for Multifunctional Devices", 2018 Conference on Information Communications Technology and Society (ICTAS), 2018, pp. 1-6.

* cited by examiner

COMPARATIVE EXAMPLE

PRESENT EMBODIMENT

FIG. 6
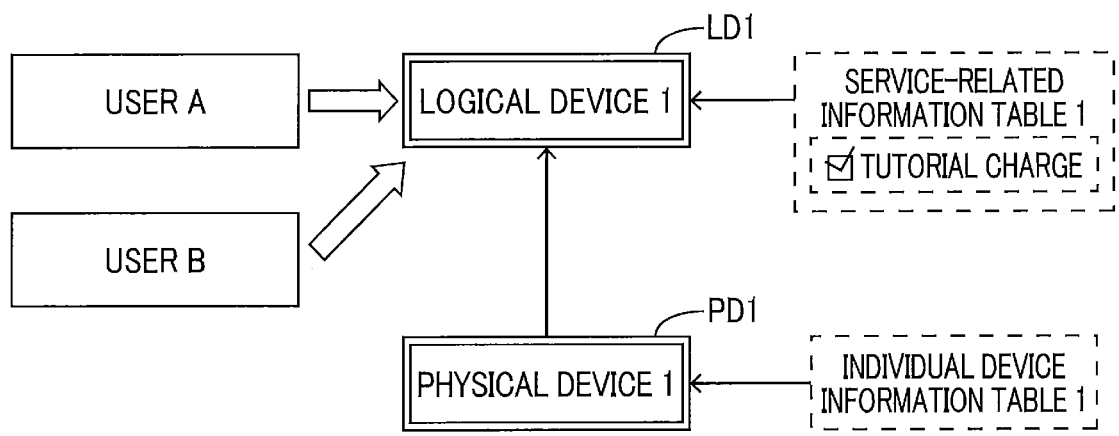
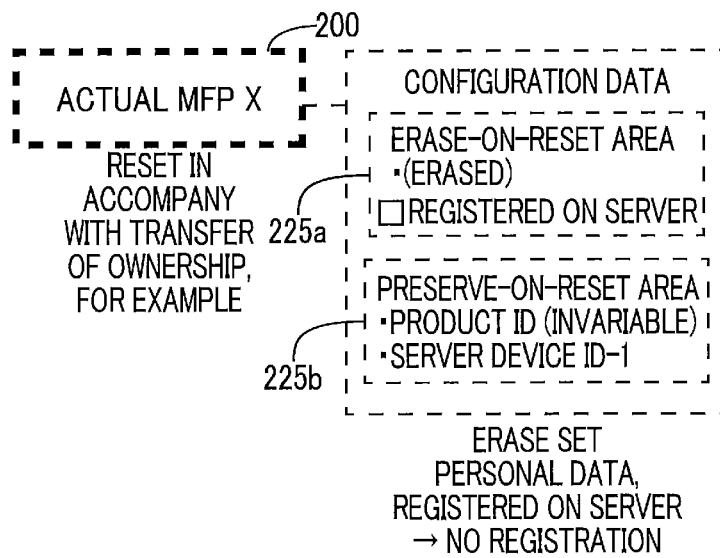

FIG. 7
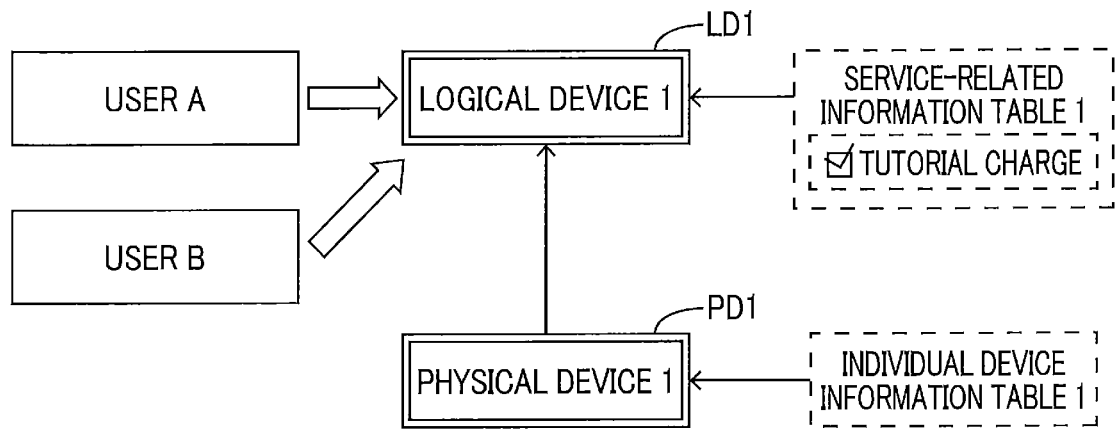
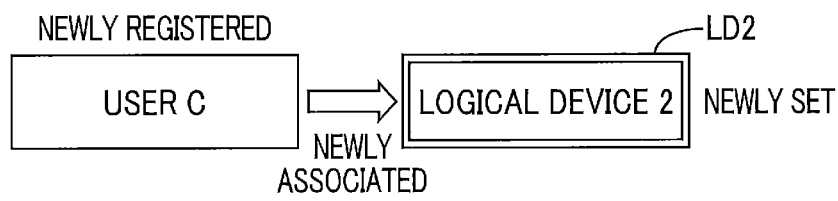
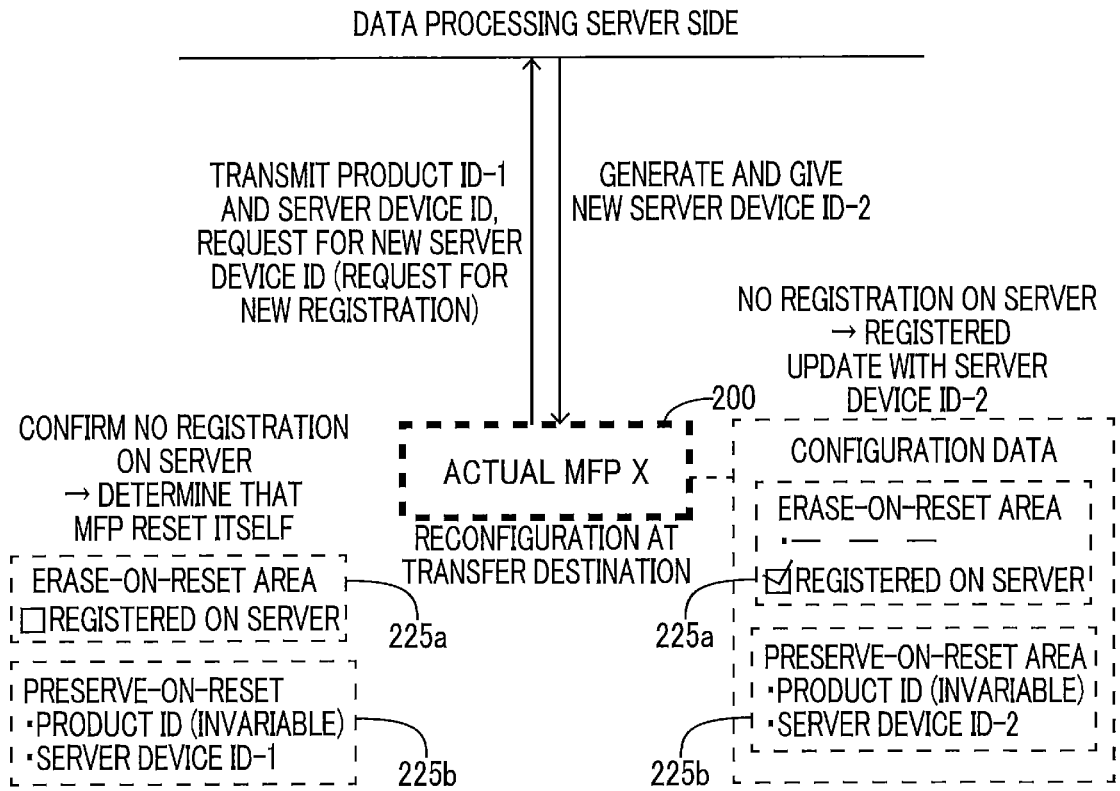

INFORMATION PROCESSING APPARATUS FOR PROHIBITING CURRENT USER OF PRINTING DEVICE FROM ACCESSING USER INFORMATION FOR FORMER USER OF THE SAME PRINTING DEVICE

REFERENCE TO RELATED APPLICATIONS

This application claims priority from Japanese Patent Application No. 2021-161718 filed Sep. 30, 2021. The entire content of the priority application is incorporated herein by reference.

BACKGROUND ART

In a conventional image-forming apparatus, the hard disk drive in the image-forming apparatus stores unique information specific to the image-forming apparatus itself, and changeable information that is modified in response to the erasure of registration data.

DESCRIPTION

In the technology used in the conventional image-forming apparatus, the registration data is erased from the image-forming apparatus once the term of the service agreement has expired. At this time, a serial number and model number constituting the unique information is not erased from the hard disk drive, while the changeable information is erased. However, if the image-forming apparatus is connected to a server and is managed by the server through user information, for example, there is potential for this user information to be leaked from the server after the service agreement has expired despite the fact that the above erasure process on the image-forming device is performed.

In view of the foregoing, it is an object of the present disclosure to provide an information processing apparatus and a device management method that can suppress user information from being leaked after the termination of use of the image forming apparatus.

In order to attain the above and other objects, according to one aspect, the present disclosure provides an information processing apparatus including a communication interface and a controller. The communication interface is communicable with a printing device via a network. The printing device is configured to perform image formation on a printing medium. The controller is configured to manage the printing device on the basis of user information of a corresponding user. The controller is further configured to perform: (a) acquiring individual information identifying the printing device; (b) acquiring initialization identification information used for determining whether an information initialization has been performed on a specific printing device identified by the individual information acquired in the (a) acquiring; (c) determining, on the basis of the individual information acquired in the (a) acquiring and the initialization identification information acquired in the (b) acquiring, whether the information initialization has been performed on the specific printing device along with transfer of ownership of the specific printing device from a first user to a second user; and (d) prohibiting, in response to determining in the (c) determining that the information initialization has been performed on the specific printing device, the second user from accessing the user information of the first user.

With the above configuration, even when a user terminates using the printing device and transfers ownership of the printing device to a new user, the new user cannot access user information of the former user. Hence, the user information of the former user can be suppressed from being leaked to the new user.

According to another aspect, the present disclosure provides a device management method for an information processing apparatus. The information processing apparatus is configured to manage a printing device on the basis of user information of a corresponding user. The printing device is configured to perform image formation on a printing medium. The device management method includes: (a) acquiring individual information identifying the printing device; (b) acquiring initialization identification information used for determining whether an information initialization has been performed on a specific printing device identified by the individual information acquired in the (a) acquiring; (c) determining, on the basis of the individual information acquired in the (a) acquiring and the initialization identification information acquired in the (b) acquiring, whether the information initialization has been performed on the specific printing device along with transfer of ownership of the specific printing device from a first user to a second user; and (d) prohibiting, in response to determining in the (c) determining that the information initialization has been performed on the specific printing device, the second user from accessing the user information of the first user.

FIG. 6 is a view illustrating changes in data and in an association configuration when a factory reset has been performed on the actual multifunction device.

FIG. 7 is a view illustrating changes in data and an association configuration when reconfiguration of the actual multifunction device is performed after transfer of ownership of the same.

Figure 1:
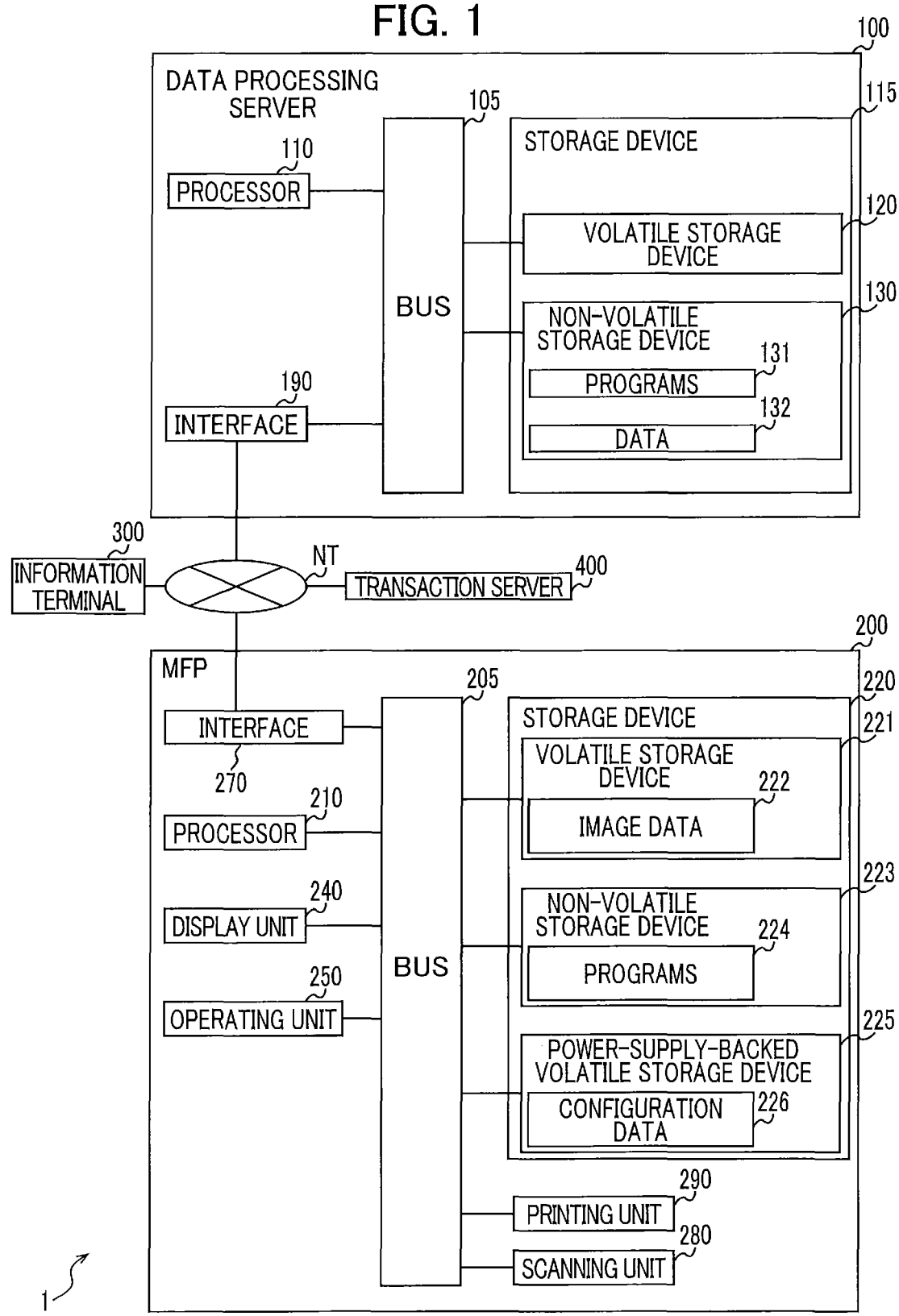
FIG. 1 is a functional block diagram illustrating the overall structure of a printing system according to the present embodiment.

FIG. 1 illustrates a printing system 1 according to one embodiment of the present disclosure. In the present embodiment, the printing system 1 provides a prepaid printing service in which users, i.e., customers can use the printing functions of a multifunction peripheral 200 by paying a fee.

<1. Outline of Printing System>

The printing system 1 illustrated in FIG. 1 includes a data processing server 100, the multifunction peripheral 200, an information terminal 300, and a transaction server 400. The data processing server 100, the multifunction peripheral 200, the information terminal 300, and the transaction server 400 are interconnected over a network NT to communicate with each other.

<1-1. Data Processing Server>

The data processing server 100 is a server that is installed and managed by the manufacturer of the multifunction peripheral 200, for example. The data processing server 100 includes a processor 110, a storage device 115, and an interface 190. The processor 110, the storage device 115, and the interface 190 are interconnected via a bus 105. The data processing server 100 is an example of the information processing apparatus.

The storage device 115 includes a volatile storage device 120, and a non-volatile storage device 130. The volatile storage device 120 is a DRAM. The volatile storage device 120 stores therein data for managing the multifunction peripheral 200. The non-volatile storage device 130 is a hard disk drive or a solid state drive, for example. The non-volatile storage device 130 has a program storage area 131 and a table storage area 132 for storing a data management table. The contents stored in these storage devices will be described later in detail.

The processor 110 is a device that performs data processing. The processor 110 is a CPU, for example. By executing a program stored in the program storage area 131, the processor 110 executes various processes illustrated in FIGS. 4 to 10 and the like described later, including processes for performing data communications with the information terminal 300, the multifunction peripheral 200, and the transaction server 400 which are connected to the network NT. The processor 110 is an example of the controller.

The interface 190 is a wired LAN interface or a wireless interface for communicating with other devices. The interface 190 is connected to the network NT via a wide-area communication interface (not illustrated). The interface 190 is an example of the communication interface.

<1-2. Transaction Server>

The transaction server 400 is a server that is installed at a company that provides various online services for settling online payments, for example. Although not illustrated in the drawings, the transaction server 400 includes a processor, a storage device, and an interface for connecting to the network NT.

<1-3. Multifunction Peripheral>

The multifunction peripheral 200 is owned by a service provider that provides the printing service described above, for example. The multifunction peripheral 200 is an example of the printing device. The multifunction peripheral 200 includes a scanning unit 280, a printing unit 290, a processor 210, a storage device 220, a display unit 240, a user-operable operating unit 250, and a communication interface 270. The scanning unit 280, the printing unit 290, the processor 210, the storage device 220, the display unit 240, the operating unit 250, and the communication interface 270 are interconnected via a bus 205.

The storage device 220 includes a volatile storage device 221, a non-volatile storage device 223, and a power-supply-backed volatile storage device 225. The volatile storage device 221 is DRAM, for example. The volatile storage device 221 has a data storage area 222 for storing image data. The non-volatile storage device 223 is flash memory, for example. The non-volatile storage device 223 has a program storage area 224. Among the various programs stored in the program storage area 224, a management process program related to data management and execution of process sequences described later in FIGS. 4 through 10 and the like, is prestored as firmware, for example. The power-supply-backed volatile storage device 225 is NVRAM, for example. The power-supply-backed volatile storage device 225 is provided with its own battery power supply and can preserve stored content even after the main power for the multifunction peripheral 200 has been turned off. The power-supply-backed volatile storage device 225 has a configuration data storage area 226 for storing configuration data described later in a partially erasable or rewritable manner. The power-supply-backed volatile storage device 225 is an example of the storage unit.

The processor 210 is a device that performs data processing. The processer 210 is a CPU, for example. The processer 210 executes the above-described management process program stored in the program storage area 224. The processer 210 also executes print control programs stored in the program storage area 224 for performing various print control in the multifunction peripheral 200. By executing the programs stored in the program storage area 224, the processor 210 can control the printing unit 290 to print images based on image data transmitted from the information terminal 300.

The display unit 240 is a liquid crystal display, for example. The operating unit 250 is a device that receives user operations. By operating the operating unit 250, the user can input various instructions into the multifunction peripheral 200. The communication interface 270 is a wired or wireless network interface for communicating with other devices. The communication interface 270 is connected to the network NT via a wide-area communication interface (not illustrated).

The scanning unit 280 is configured to optically read a scanning target such as a document using photoelectric conversion elements such as a CCD or a CMOS, and to generate scan data representing an image of the read scanning target.

The printing unit 290 is configured to pick up a sheet from a feed tray of the printing unit 290 and to print an image on the sheet according to a prescribed method while conveying the sheet using a conveying mechanism (not illustrated) of the printing unit 290. The following specification describes a case in which the printing unit 290 performs printing according to an inkjet method. The sheet is an example of the printing medium.

<1-4. Information Terminal>

The information terminal 300 in the present embodiment is an information terminal (terminal device) such as a desktop personal computer, a tablet computer, or a smartphone possessed by the user. The information terminal 300 is connected to the network NT through, for example, wireless communication. Although not illustrated in the drawings, the information terminal 300 includes a processor, a storage device, and an interface for connecting to the network NT. In this example, the processor of the information terminal 300 utilizes an operating system (OS) provided with universal printing capabilities, such as Mopria and AirPrint. An application program for utilizing the printing service described above is installed in advance in the information terminal 300. The application program is executed and developed on the OS. Note that the information terminal 300 is not limited to the above-mentioned desktop personal computer, a tablet computer, or a smartphone, but other types of information terminals may be used as the information terminal 300.

<2. Logical Devices and Physical Devices>

The printing system 1 according to the present embodiment described above provides a prepaid printing service in which users pay a fee to use the printing functions of the multifunction peripheral 200. Specifically, users (i.e., customers) can use the printing service provided on the printing system 1 according to a service agreement. The printing service can be used with a multifunction peripheral 200 possessed by the provider of the printing service or purchased by the user. In the printing service, the user pre-purchases via the information terminal 300 authorization to execute a prescribed number of prints on the multifunction peripheral 200. In other words, a pay-as-you-go system is employed in the printing service in which the user can execute only the prescribed number of prints stipulated in the specific printing service plan that the user has ordered. In this system, the data processing server 100 directly receives an order for a printing service from the information terminal 300, the transaction server 400 indirectly handles an online payment for that order, and the printing service is applied to the multifunction peripheral 200 once payment has been settled.

Figure 2:
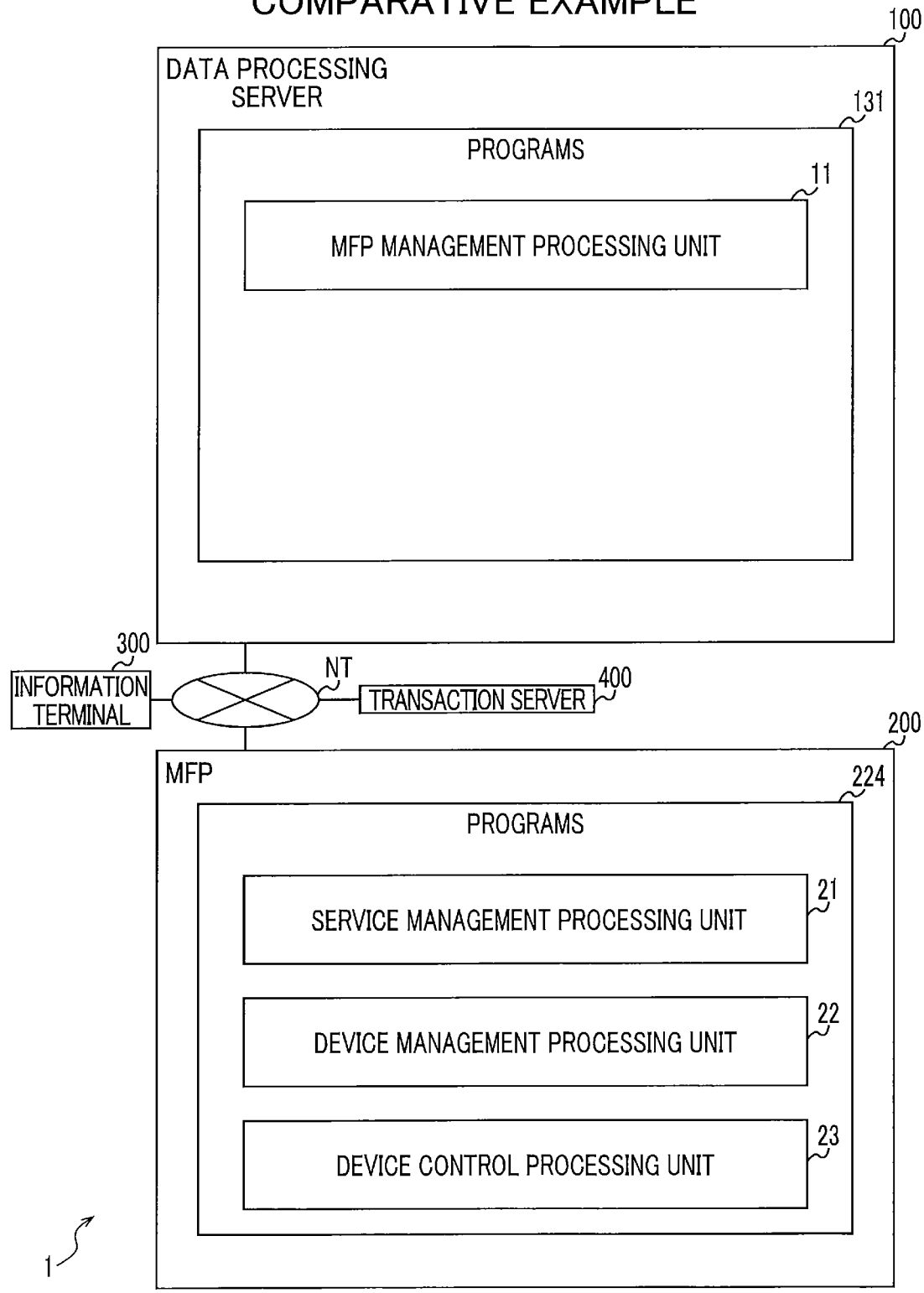
FIG. 2 is a view illustrating a shared configuration employed in a comparative example for sharing software processes.

To coordinate the above processes for the printing service, software processes might be shared between the data processing server 100 and multifunction peripheral 200, as in the comparative example shown in FIG. 2. In the example of FIG. 2, the data processing server 100 is provided with a program corresponding to an MFP management processing unit 11, and the multifunction peripheral 200 is provided with programs corresponding to a service management processing unit 21, a device management processing unit 22, and a device control processing unit 23. The MFP management processing unit 11 of the data processing server 100 comprehensively manages information on multifunction peripherals 200 for which the data processing server 100 is responsible. The service management processing unit 21 of the multifunction peripheral 200 processes printing service orders received from contracted users of the multifunction peripheral 200 and manages related information. The device management processing unit 22 manages mechanical conditions, such as abnormalities or the status of consumables in the multifunction peripheral 200. The device control processing unit 23 performs processes related to basic device control, such as printing operations, input operations, and displaying operations on the multifunction peripheral 200. The prepaid printing service described above can be implemented even when software processing is shared between the data processing server 100 and multifunction peripheral 200, as described above. However, this shared configuration provides little freedom for various settings and cannot flexibly handle reconfigurations and the like required when ownership of the multifunction peripheral 200 is transferred among users, as will be described later.

Figure 3:
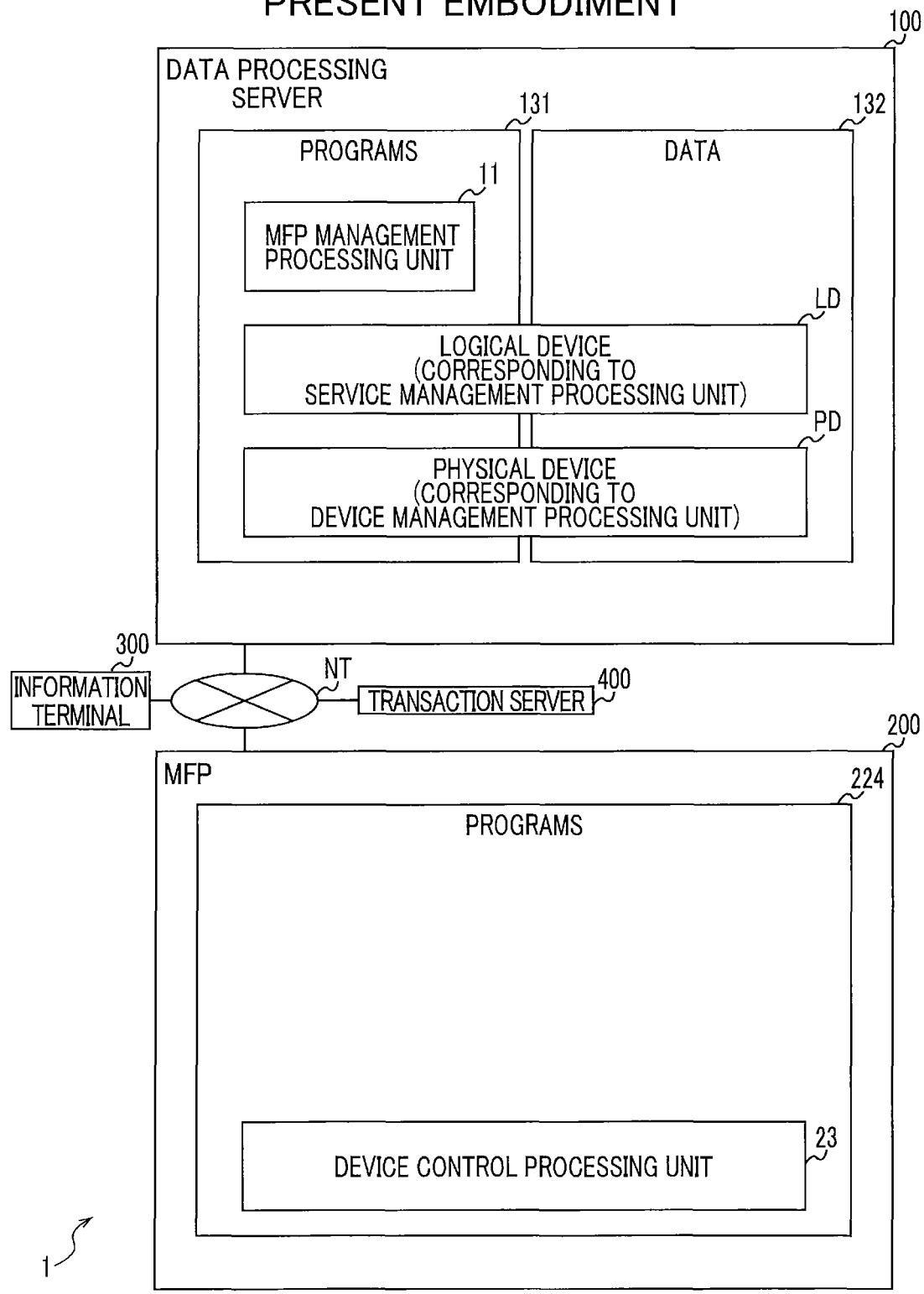
FIG. 3 is a view illustrating a shared configuration for sharing software processes between a data processing server and a multifunction peripheral in the present embodiment.

In contrast, this embodiment employs a shared configuration, such as that shown in FIG. 3, in which the functions of the service management processing unit 21 and device management processing unit 22 for each individual multifunction peripheral 200 are implemented on the data processing server 100 side. In this case, the data processing server 100 performs service management processes (corresponding to the functions of the service management processing units 21) using logical devices LD as virtual machines not tied to any specific multifunction peripheral 200 and performs device management processes (corresponding to the functions of the device management processing units 22) using physical devices PD each of which is tied to a specific multifunction peripheral 200.

<3. Configuration of Associations with the Logical Device and Physical Device>

Figure 4:
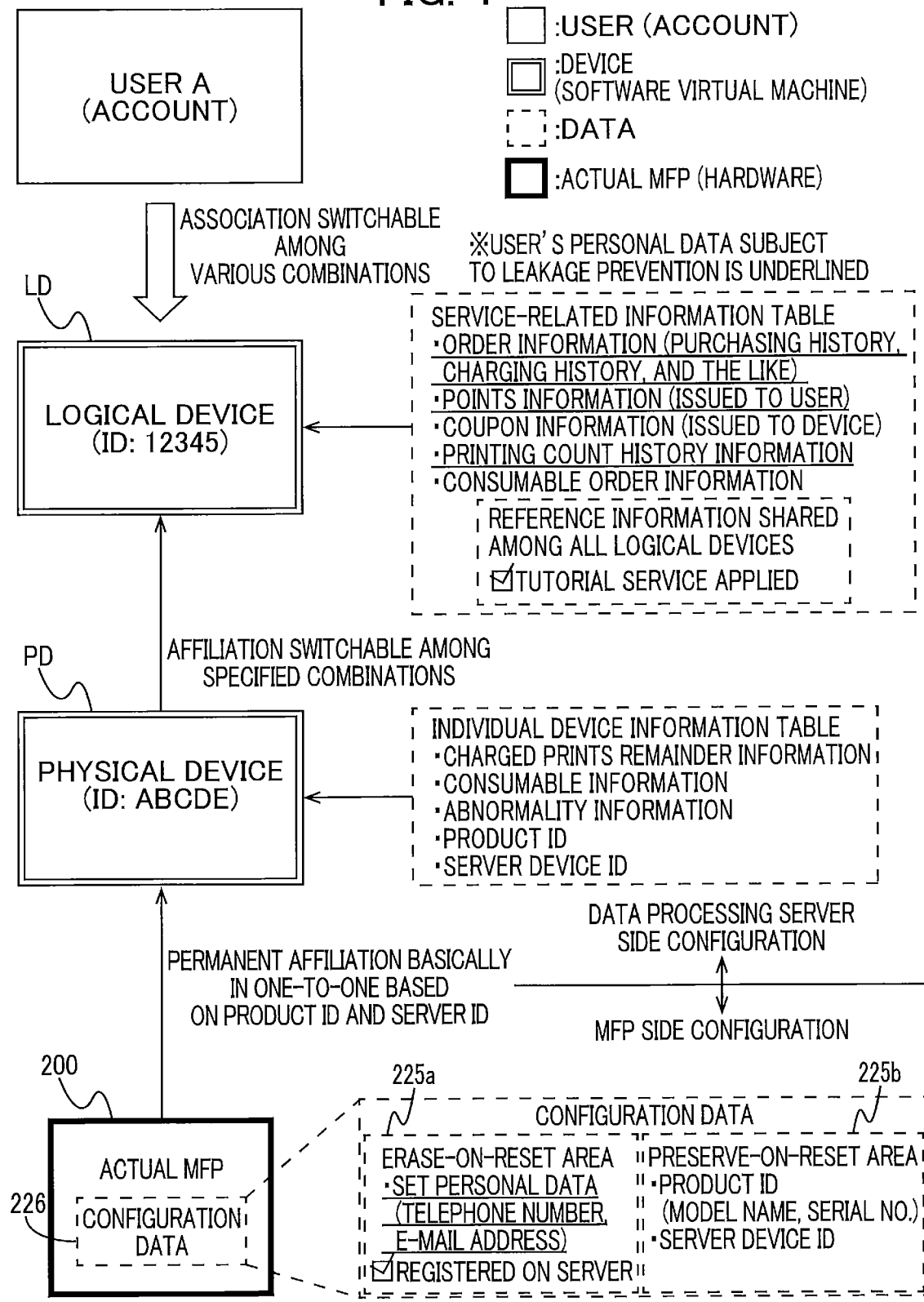
FIG. 4 is a view illustrating one example of a specific association configuration between a physical device and a logical device.

FIG. 4 shows one sample configuration of specific associations with the logical device LD and physical device PD. First, the logical device LD itself is individually identified by an ID ("ID: 12345" in the example of FIG. 4) that is uniquely set and assigned to each service agreement. The account of a contracted user registered on the data processing server 100 is associated with this logical device LD. Note that the associations of users to logical devices LD may be modified in various ways, such as linking a plurality of users to a single logical device LD or, conversely, associating a plurality of logical devices LD (i.e., a plurality of multifunction peripherals 200) to a single user.

The physical device PD itself is also individually identified by an ID ("ID: ABCDE" in the example of FIG. 4) uniquely set and assigned as appropriate. A single actual multifunction peripheral 200 is always permanently associated one-on-one with the physical device PD based on a product ID and server device ID described later and is in a state in which the mechanical conditions of the multifunction peripheral 200 can be referenced in real-time (hereinafter, being in a referable state will be referred to as "affiliated"). The physical device PD is switchably affiliated with logical devices LD according to specified combinations.

The logical device LD and physical device PD are used for managing data for their respective processes. The logical device LD manages various information related to printing services for associated users in a data table. Some specific examples of the information being managed are order information, points information, coupon information, printing count history information, consumable order information, and tutorial charge information. The user selects and orders printing authorization from among various service plans available for the multifunction peripheral 200. In this example, the service plans include charges such as 100 yen for 100 prints and 250 yen for 300 prints. Although not shown in the drawings, these service plans are prepared in advance on the data processing server 100. The data processing server 100 also awards the user service points equivalent to a certain percentage of the amount charged for an order. Coupons worth a certain amount of printing privileges are also issued free-of-charge at promotional events and the like. In the printing service described above, information on the user's order purchasing history and charging history is managed as the order information associated with separately generated receipt data (not shown); information on service points is managed as the points information; and information on coupons is managed as the coupon information. The printing count history information is used to manage the number of prints under this printing service, i.e., how many of the executable prints the user pre-purchased for printing on the multifunction peripheral 200 have been actually printed. The consumable order information is used to manage details of the user's past orders for consumables such as ink cartridges used in the multifunction peripheral 200.

In addition to the paid orders and the use of coupons described above, the printing service in this example offers a tutorial charge plan as one form of charging (adding to) executable prints for the multifunction peripheral 200. This tutorial charge is a one-time only charging authorization provided either free-of-charge or at a substantial discount for business purposes. The service is intended for users who are using a new multifunction peripheral 200 for the first time, enabling the users to learn how to perform operations for charging (adding to) printing credit (executable prints) or ensuring that their initial use of the multifunction peripheral 200 goes smoothly. In this embodiment, the target of the service points and coupons described above can be freely set to individual users, logical devices LD, or physical devices PD (i.e., multifunction peripherals 200) according to the type of business model. However, this tutorial charge can be applied only once to a newly purchased multifunction peripheral 200 for the reasons described above. Tutorial charge information indicates whether the tutorial charge has already been applied. Even if an individual multifunction peripheral 200 is repeatedly transferred to different users, as will be described later, the tutorial charge information is passed on to the successive logical devices LD each time the multifunction peripheral 200 is reconfigured. Thus, the tutorial charge information is information shared among and referenced by these logical devices LD.

Various information related to mechanical conditions on the single multifunction peripheral 200 affiliated with the physical device PD is managed in an individual device information table. Specifically, the information managed in this table includes charged prints remainder information, consumable information, abnormality information, product ID, and server device ID. The charged prints remainder information is used to manage the number of remaining executable prints of the executable prints charged (added) by the user for the affiliated multifunction peripheral 200. The consumable information is used to manage the remaining quantities and statuses of consumables in the multifunction peripheral 200, such as ink cartridges. The abnormality information is used to manage unauthorized operations on the multifunction peripheral 200 or abnormalities and malfunctions that have occurred on the multifunction peripheral 200. The product ID is identification information uniquely assigned to the individual multifunction peripheral 200 affiliated with the physical device PD, as described above. The server device ID is identification information that is uniquely assigned to this individual multifunction peripheral 200 when registering that multifunction peripheral 200 on the data processing server 100 to be managed by the same, as will be described later. In this way, the ID for the physical device PD itself can be uniquely associated with the combination of this product ID and server device ID, and accordingly, can be identified using this combination.

Configuration data is stored in the configuration data storage area 226 of the power-supply-backed volatile storage device 225 of the multifunction peripheral 200. In the multifunction peripheral 200 according to this embodiment, the user can perform a factory reset through prescribed operations on the operating unit 250 to return the multifunction peripheral 200 to its initial factory state. Thus, the configuration data storage area 226 for configuration data in the power-supply-backed volatile storage device 225 is divided into an erase-on-reset area 225a whose contents are deleted by a factory reset, and a preserve-on-reset area 225b whose contents are not deleted by a factory reset. The erase-on-reset area 225a stores therein personal data, such as telephone numbers and e-mail addresses, set separately by the user when using the multifunction peripheral 200, and server registration information indicating whether the multifunction peripheral 200 has been registered on the data processing server 100 to be managed by the same.

The preserve-on-reset area 225b stores therein the product ID and server device ID for the multifunction peripheral 200. The product ID is a combination of information specifying the model name of the multifunction peripheral 200 and information specifying the serial number uniquely assigned to the multifunction peripheral 200 at the time of manufacture at the factory, for example, and serves to uniquely identify that multifunction peripheral 200 among the plurality of multifunction peripherals 200 distributed on the market. This product ID is treated as invariable storage information that must not be deleted or modified under any circumstances.

The server device ID corresponds to a registration ID that the data processing server 100 uniquely generates and individually assigns to a registration application when a user registers to use the printing service described above for the multifunction peripheral 200. That is, after a factory-shipped multifunction peripheral 200 is newly purchased for use, the multifunction peripheral 200 may be transferred repeatedly among different users through a market for secondhand equipment, for example. Each time the multifunction peripheral 200 is transferred to a new user, the new user reconfigures the multifunction peripheral 200 to use the printing service, connecting to the data processing server 100 via the network NT and applying to register for the printing service. At this time, the data processing server 100 generates and assigns a new server device ID to the new registration application. In this way, the data processing server 100 can differentiate the same multifunction peripheral 200 among each of these registrations and can set and identify a physical device PD that is uniquely associated with both the product ID and server device ID of the multifunction peripheral 200.

Of the various data described above, the present embodiment suppresses data including order information, user-issued points information (i.e., points information on points issued to a user), and printing count history information (the information underlined in FIG. 4) from being leaked to users who have registered the same multifunction peripheral 200 at different times. That is, even when the multifunction peripheral 200 is transferred repeatedly among different users, this data is preserved as protected personal information associated with the user of the respective registration, while users are suppressed from accessing information for users of different registrations. Other data, such as the charged prints remainder information, consumable information, abnormality information, and product ID, is kept for reference as the most recent data indicating the mechanical conditions of the multifunction peripheral 200 at the time the multifunction peripheral 200 was last transferred. Registered personal data stored in the power-supply-backed volatile storage device 225 of the multifunction peripheral 200 is also protected personal information that must be suppressed from being leaked to other users. The registered user erases this registered personal data through a factory reset prior to transferring the multifunction peripheral 200.

The order information is an example of the non-free printing authorization information. The points information is an example of the free printing authorization information. The coupon information and the tutorial charge information are each an example of the device printing authorization information. The printing count history information is an example of the printing quantity information indicative of a quantity already printed. The consumable order information is an example of the consumable order information for consumables. The account of a user, the order information, the points information, and the printing count history information are each an example of the user information. The product ID is an example of the individual information. The factory reset is an example of the information initialization.

The content of the service-related information table is an example of the service information. The erase-on-reset area 225a is an example of the first storage area. The preserve-on-reset area 225b is an example of the second storage area.

<4. Processing Sequence During Normal Use and During Reconfiguration After a Reset>

Next, the processing sequence for various data and devices that occurs during normal use of the printing system 1 according to the present embodiment and when reconfiguring the multifunction peripheral 200 following a transfer of ownership will be described with reference to FIGS. 5 through 10. Note that various data and the like are included in each drawing according to need and omitted from others as appropriate.

Figure 5:
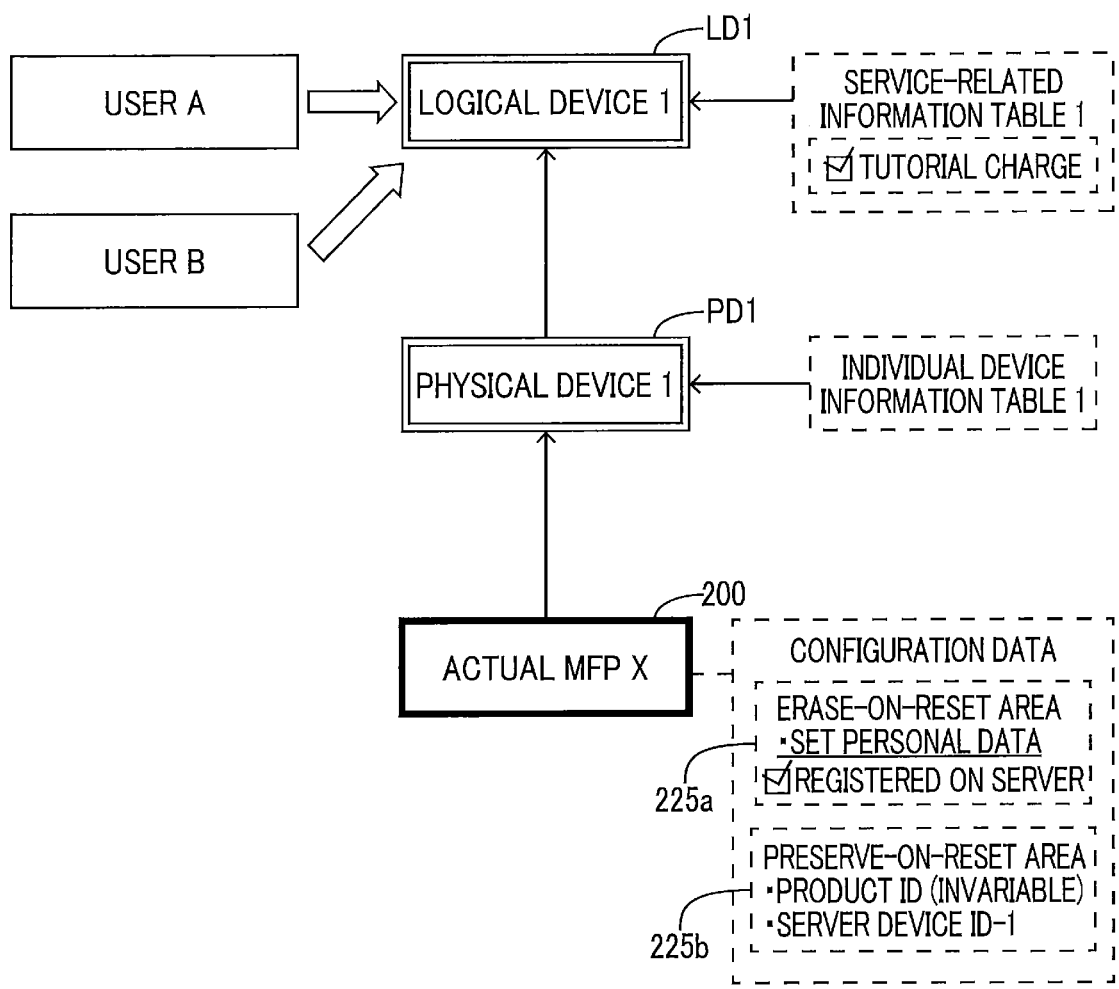
FIG. 5 is a view illustrating a state where an actual multifunction device has been normally setup and a printing service of the printing system is ready for use.

First, FIG. 5 shows the state of the printing system 1 whose printing service is ready for use. In this case, a multifunction peripheral 200 (referred to in the drawing as "actual multifunction device X" to signify an individual device) has been setup normally on the data processing server 100 and registered for service. In this example, the actual multifunction device X has been set to be affiliated with a setup including a physical device PD1 and a logical device LD1 in the data processing server 100. Also, accounts for two users A and B are associated with the single logical device LD1 in this example, and the printing service can be used mutually by both users A and B. This example also assumes that the tutorial charge, which is a benefit provided for the first purchase of the actual multifunction device X, has already been applied. Therefore, a flag for the tutorial charge information, which is provided in a service-related information table 1 referenced by the logical device LD1, has been set (a checkmark has been inserted into the box in the drawing).

Further, while omitted from FIG. 5, the product ID of the actual multifunction device X and a server device ID-1 issued at the time of service registration have been recorded in an individual device information table 1, which is referenced by the physical device PD1. On the actual multifunction device X, personal data such as telephone numbers and e-mail addresses set by the users A and B is recorded in the erase-on-reset area 225a of the power-supply-backed volatile storage device 225, and a flag for the server registration information is set to indicate that the actual multifunction device X is registered (a checkmark has been inserted into the box in the drawing). Additionally, the product ID for the actual multifunction device X and the server device ID-1 issued by the data processing server 100 at the time of service registration are recorded in the preserve-on-reset area 225b.

While not shown in the drawing, the data processing server 100 in this state offers various types of paid charging plans that the user can select. For example, user A selects one specific paid charging plan via the information terminal 300 and issues an instruction to purchase and apply that plan, and then an order process for that plan is initiated. Once user A has completed payment for this paid charging plan via the separate transaction server 400, the charged prints remainder information for the physical device PD1 is updated in the order process by increasing (charging) by the number of executable prints purchased in the paid charging plan. The physical device PD1 also transmits the number of purchased executable prints to the actual multifunction device X affiliated with the physical device PD1. This method enables user A to order a paid charging plan of the user's choosing in order to increase (charge) the number of executable prints that can be executed on the actual multifunction device X by the corresponding purchased quantity.

Service points described above are generated and managed and coupons are issued based on their accumulation through suitable processes performed between the data processing server 100 and transaction server 400. Coupons, which are complimentary ordering privileges, are registered on the data processing server 100 so that the user can select the coupon as a type of charging plan. When the user applies a coupon, an instruction to charge (increase) the number of executable prints by that equivalent to the coupon's value is immediately issued to the logical device LD1 without waiting for payment. Subsequently, a flag is set in the coupon information to indicate that the coupon has been used (not shown).

If users A and B subsequently wish to transfer ownership of the actual multifunction device X, the users perform a factory reset to erase personal data and the like stored on the actual multifunction device X. As a result of this factory reset, the personal data and the flag setting for the server registration information are erased from the erase-on-reset area 225a of the power-supply-backed volatile storage device 225, as illustrated in FIG. 6. However, the product ID and server device ID-1 are not deleted from the preserve-on-reset area 225b but remain preserved, even if the main power to the actual multifunction device X is turned off for a long period of time. Moreover, the actual multifunction device X can execute this factory reset process itself independently, with no participation by the data processing server 100. Hence, immediately after the actual multifunction device X executes a factory reset, the data processing server 100 cannot determine that a factory reset was executed on the actual multifunction device X and continues to preserve the corresponding physical device PD1, logical device LD1, and respective data to which they refer.

Next, the process shown in FIG. 7 is performed to reconfigure the actual multifunction device X at the transfer destination. When the power to the actual multifunction device X is restarted after a reset, the actual multifunction device X performs an initial routine to check the status of the flag in the server registration information and, based on the erased state of this flag, determines that a factory reset has been performed. After determining this reset status and when the actual multifunction device X is connected to the data processing server 100 via the network NT, the actual multifunction device X transmits information specifying the product ID and the previous server device ID-1 currently recorded in the preserve-on-reset area 225b and requests that the data processing server 100 issue a new server device ID.

In response to receiving the product ID, server device ID-1, and request to issue a new server device ID, the data processing server 100 determines that the actual multifunction device X has been reset and processes the request as a new application to register for printing services. Specifically, the data processing server 100 generates a new unique server device ID-2 to correspond to this service registration and returns and gives this server device ID-2 to the actual multifunction device X. Also, in response to this service registration, the data processing server 100 configures a new logical device LD2 to which a newly generated unique ID is assigned.

The actual multifunction device X then updates the preserve-on-reset area 225b by overwriting the previous server device ID-1 with the new server device ID-2 received from the data processing server 100 and records the registered state of the multifunction peripheral 200 by setting the flag in the server registration information. At this point, a user C of the actual multifunction device X can access the data processing server 100 via the information terminal 300 and can link the user's account to the new logical device LD2 through authentication operations to verify the product ID or server device ID-2.

Figure 8:
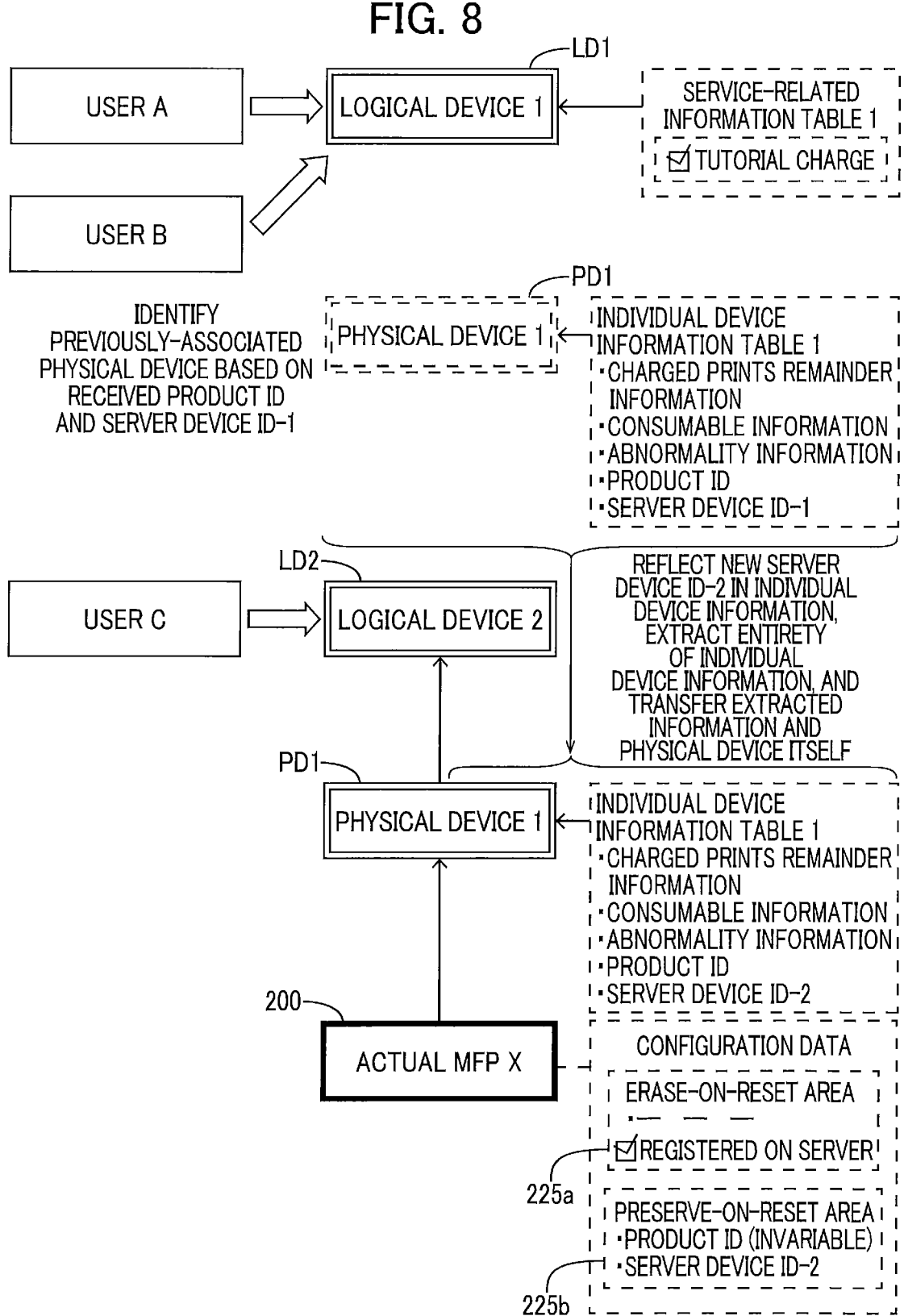
FIG. 8 is a view illustrating a state where the physical device is transferred to be affiliated with a new logical device in response to transfer of ownership of the actual multifunction device.
Figure 9:
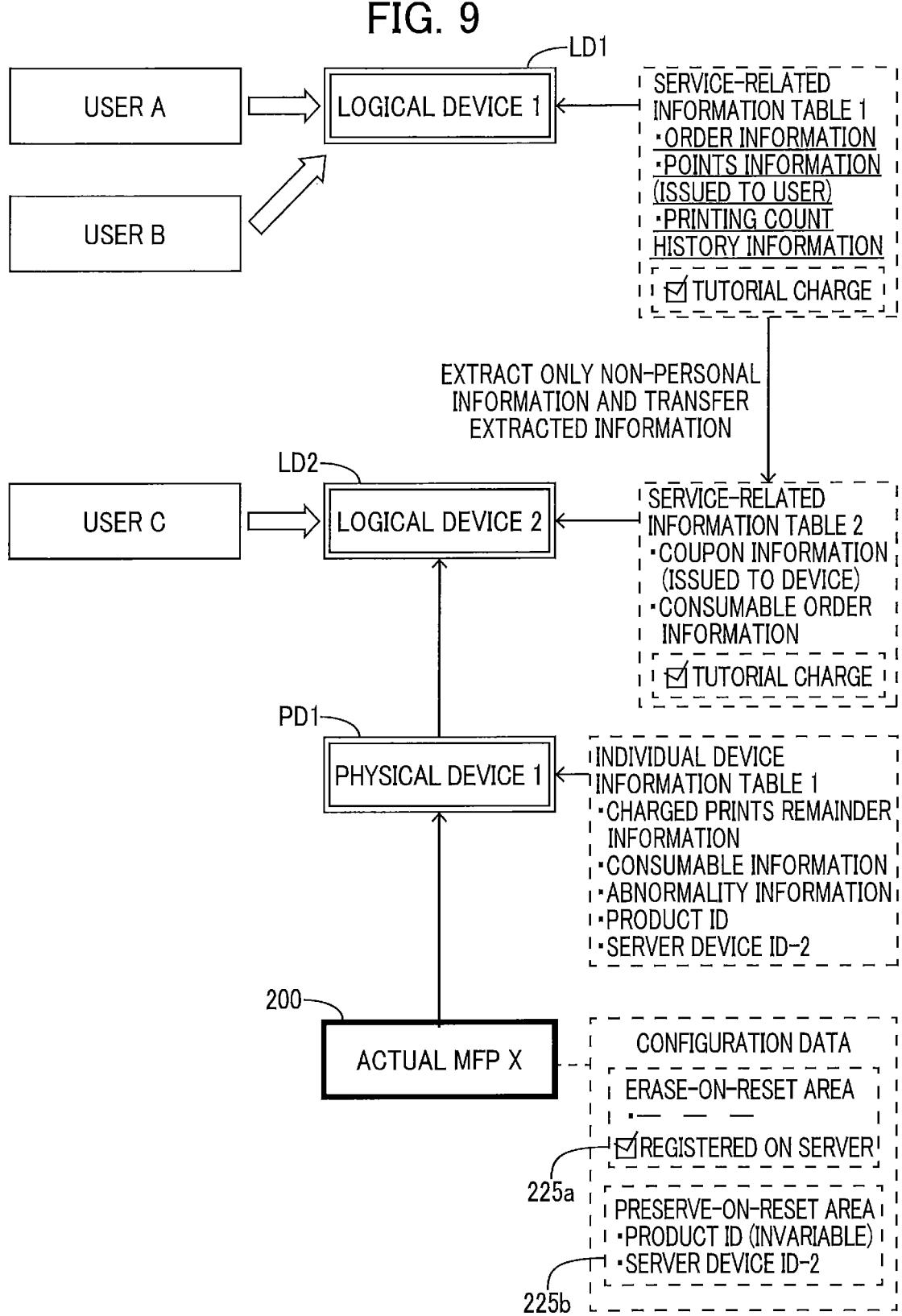
FIG. 9 is a view illustrating a state where only non-personal information is extracted from a former service-related information table and is transferred to be affiliated with a new logical device.
Figure 10:
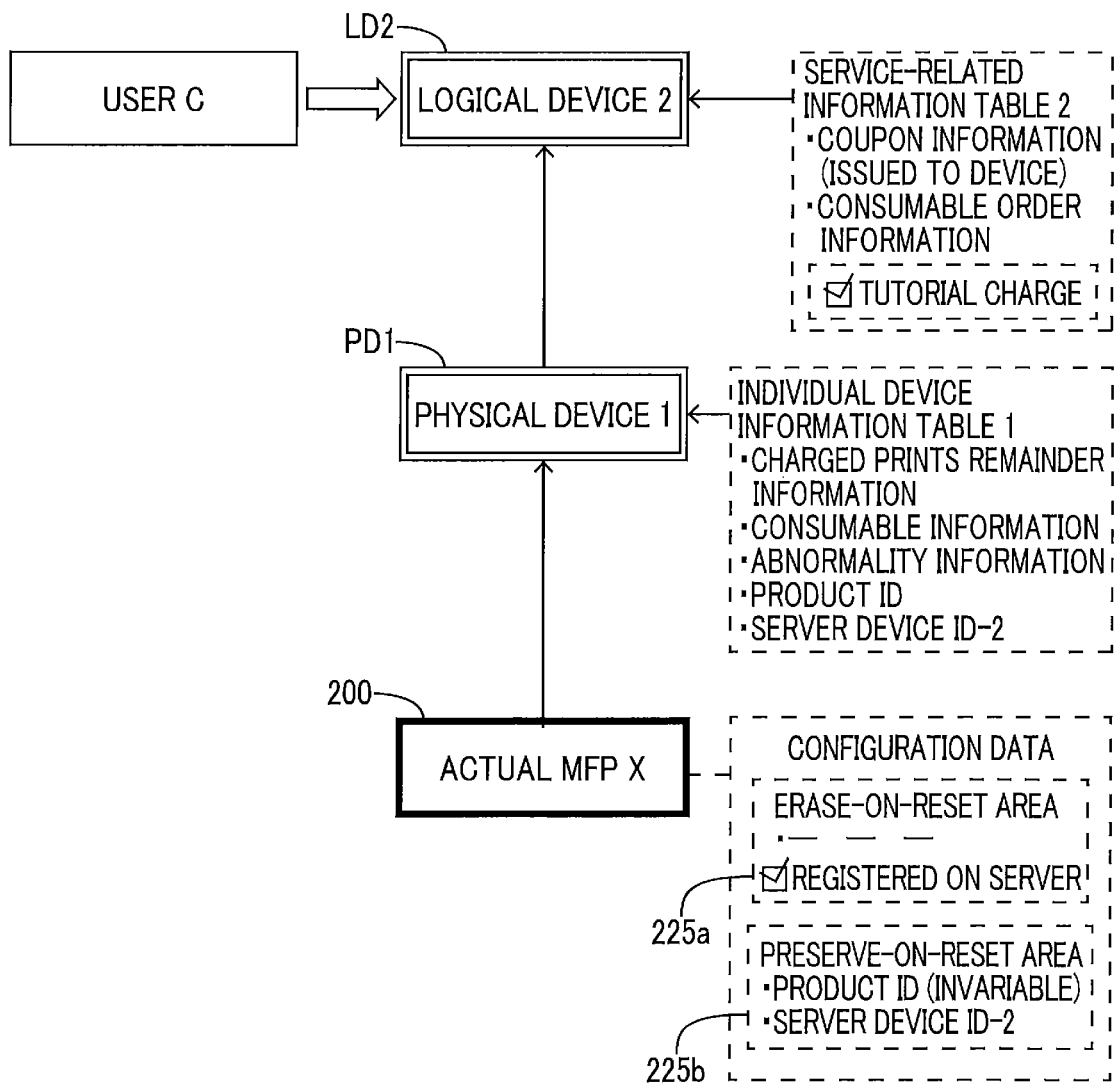
FIG. 10 is a view illustrating data and an association configuration when reconfiguration of the actual multifunction device has been completed after transfer of ownership of the same.

Next, based on the product ID and server device ID-1 received from the actual multifunction device X, the data processing server 100 identifies the physical device PD1 that is associated with the previous service registration for the actual multifunction device X, as illustrated in FIG. 8. With the exception of the server device ID, the data content in the individual device information table 1 referenced by this physical device PD1 is the most current information on the mechanical conditions of the actual multifunction device X at this time. Accordingly, the entire data content of the individual device information table 1 is extracted, the extracted data content and the physical device PD1 itself are transferred to be affiliated with the new logical device LD2, and the new server device ID-2 is reflected as the server device ID. The data processing server 100 also sets the actual multifunction device X to once again be affiliated with the physical device PD1. This process completely separates the actual multifunction device X from the previous setup having the logical device LD1 and blocks access from the former users A and B.

Next, of the data in the service-related information table 1 referenced by the preceding logical device LD1, device-issued coupon information (i.e., coupon information on coupons issued to the actual multifunction device X) and consumable order information are extracted as data in a new service-related information table 2 to be referenced only by the user of the new logical device LD2. As a result, the device-issued coupon information and consumable order information are no longer preserved in the service-related information table 1. However, all other data in the service-related information table 1, such as order information, user-issued points information, and printing count history information, is preserved in the service-related information table 1 to be referenced only by the users of the logical device LD1. Only the tutorial charge information is stored in both the previous service-related information table 1 and the new service-related information table 2. As a result of executing the above sequence, the distribution of information to the previous users A and B of the actual multifunction device X and the new user C of the same actual multifunction device X is completely separated, suppressing the distribution (leakage) of protected information held by each.

The distinction between what data among the service-related information described above is extracted and transferred and what data is retained is determined according to the business model of the printing service. Specifically, information targeted for retention, including order information associated with receipt data, user-issued points information, and printing count history information related to the user's charging history should all be interpreted as the user's protected personal information for the corresponding service registration and should not be disclosed to users of other registrations. However, information targeted for transfer, including device-issued coupon information issued only for an individual multifunction peripheral 200 and consumable order information in which the number of times of orders for consumables and the like is only applicable to the individual device in question, should be referenced in association with the individual actual multifunction device X and must always be transferred and remain associated with that actual multifunction device X. The tutorial charge information is a setting that can only be applied once to the actual multifunction device X and must be stored for any corresponding service registrations.

Here, the present embodiment retains the user's protected personal information in the corresponding logical device LD for each service registration so that the user can reference this information, while suppressing leakage of the protected information. When a past user reregisters for printing services on a new multifunction peripheral 200, the data processing server 100 can continue to apply the same data from the past service-related information. Further, information such as the services associated with a single multifunction peripheral 200 is always transferred such that only the physical device PD associated with that device can reference this information, thereby suppressing multiple users of different service registrations from using the service. Further, the system also ensures that the one-time application of the tutorial charge is enforced, even if a user repeatedly registers for service for the same multifunction peripheral 200.

The actual multifunction device X is an example of the specific printing device. Users A and B are an example of the first user. User C is an example of the second user. The logical device LD1 is an example of the first logical device. The physical device PD1 is an example of the specific physical device. The logical device LD2 is an example of the second logical device. The process in which the data processing server 100 receives the product ID is an example of the (a) acquiring. The request for a new server device ID transmitted from the actual multifunction device X is an example of the initialization identification information. The process in which the data processing server 100 receives the request for a new server device ID is an example of the (b) acquiring. The process in which the data processing server 100 determines whether the actual multifunction device X has been reset is an example of the (c) determining. The process in which the data processing server 100 prohibits user C from accessing the service-related information table 1 of users A and B is an example of the (d) prohibiting. The process in which the data processing server 100 associates the account of a user with the logical device LD is an example of the (e) registering. The process in which the physical device PD1 is extracted from the setup having the logical device LD1 and transferred to be affiliated with the logical device LD2 is an example of the (f) discarding and establishing. The process in which the protected personal information is made invisible in the service-related information table 1 is an example of the (g) correcting. The process in which the information in the service-related information table 1 other than the protected personal information is associated with the new logical device LD2 so as to be referenced by the same is an example of the (h) registering.

<5. Effects of the Embodiment>

As described above, the data processing server 100 provided in the printing system 1 of the embodiment manages the multifunction peripheral 200 based at least on user information for the users of this multifunction peripheral 200. When ownership of the multifunction peripheral 200 is transferred among users, such as from users A and B to user C in the above example, the leakage of user information of users A and B is suppressed.

Specifically, the processor 110 acquires the product ID of the multifunction peripheral 200 and a request for a new server device ID from the multifunction peripheral 200 in the embodiment. The request for a new server device ID is information indicating that the multifunction peripheral 200 has been factory reset. Based on the acquired product ID and request for a new server device ID, the processor 110 determines that a factory reset has been executed on the actual multifunction device X. In this way, the processor 110 determines whether the actual multifunction device X corresponding to the above product ID has been factory-reset by users A and B along with transfer of ownership of the actual multifunction device X to another user. If the processor 110 determines that a factory reset of the actual multifunction device X has been performed, the processor 110 suppresses user C from accessing the user information of users A and B.

According to the present embodiment, even though use of the multifunction peripheral 200 by the former users A and B has ended and the multifunction peripheral 200 has been transferred to a new user C, the new user C cannot access user information of the former users A and B, thereby suppressing user information of the former users A and B from being leaked to the new user C.

Another feature of this embodiment is that the processor 110 manages the multifunction peripheral 200 by conceptually dividing the multifunction peripheral 200 into a physical device PD, and a logical device LD associated with that physical device PD. The physical device PD is a concept associated with the product ID of the multifunction peripheral 200. The logical device LD is a concept associated with a service-related information table for the provision of services utilizing the multifunction peripheral 200. The processor 110 associates the account of at least one user with the logical device LD associated with the service-related information table.

For example, when users A and B stop using the actual multifunction device X and transfer ownership of the actual multifunction device X to a new user C, the physical device PD1 for the actual multifunction device X is passed on to the new user. In this embodiment, the processor 110 acquires the product ID from the actual multifunction device X at the time of transfer and determines that the acquired product ID has been associated with the physical device PD1 for that specific actual multifunction device X.

When the processor 110 determines on the basis of the acquired product ID that a factory reset has been performed on the actual multifunction device X having that product ID, the processor 110 updates the association of the physical device PD1. That is, the actual processor 110 discards the association between the physical device PD1 linked to the actual multifunction device X and the logical device LD1 linked to users A and B, and instead establishes an association between the physical device PD1 and the logical device LD2 linked to user C. Hence, the logical device LD associated with the physical device PD1 is changed from the logical device LD1 to the logical device LD2.

In the present embodiment, a process is performed to correct the service-related information table 1 rather than simply changing the association of the service-related information table 1 from the logical device LD1 to the new logical device LD2. This process includes an appropriate process (such as a deletion process) to make invisible at least content related to the user information of users A and B from content in the service-related information table 1 associated with the logical device LD1. Once corrected through this process, the service-related information table 1 is then registered in association with the new logical device LD2.

The data processing server 100 according to the present embodiment conceptually views a multifunction peripheral 200 as being divided into a logical device LD1 associated with the service-related information table 1 and a physical device PD1 associated with the product ID of the multifunction peripheral 200. When ownership of the multifunction peripheral 200 is transferred from users A and B to user C, the physical device PD1 for the multifunction peripheral 200 is then associated with the new logical device LD2 instead of the logical device LD1. The service-related information table 1 associated with the logical device LD1 is then associated with the new logical device LD2 as the service-related information table 2 after content related to the user information for users A and B has been made invisible in the service-related information table 1. Thus, when ownership of a multifunction peripheral 200 is transferred from users A and B to user C in the present embodiment, only the service-related information table 1 in which user information of users A and B has been made invisible is associated with the logical device LD2 that is newly associated with the physical device PD1. Since user C cannot access user information of the former users A and B, the present embodiment can reliably suppress this user information from being leaked to user C.

Another feature of this embodiment is that the power-supply-backed volatile storage device 225 of the multifunction peripheral 200 is provided with the erase-on-reset area 225a and preserve-on-reset area 225b, and that the product ID is stored in the preserve-on-reset area 225b, which is not erased even when a factory reset has been performed. Since the product ID is not erased, the processor 110 can reliably acquire the product ID preserved in the preserve-on-reset area 225b.

Another feature of the present embodiment is that the processor 110 acquires a request for a new server device ID from the multifunction peripheral 200. The request for a new server device ID is generated due to the fact that the flag for the server registration information has been erased from the erase-on-reset area 225a in the multifunction peripheral 200. In this way, the multifunction peripheral 200 can determine based on the erasure of the flag for the server registration information that the multifunction peripheral 200 itself has been reset, and the processor 110 can confirm that the request for a new server device ID was sent on that basis.

Another feature of the present embodiment is that the content of the service-related information table 1 includes at least one of the order information and points information. The order information describes orders obtained by users A and B for a fee, while the points information describes points awarded to users A and B for free. The content of both include user information related to users A and B. Therefore, in at least one of the order information and points information associated with the logical device LD1, content related to user information is made invisible.

When ownership of a multifunction peripheral 200 is transferred from users A and B to user C in the present embodiment, only order information or points information in which user information related to users A and B has been made invisible is associated with the logical device LD2 to be newly associated with the physical device PD1. Since user C cannot access user information of users A and B, this embodiment can reliably suppress the leakage of such user information. Note that in the present disclosure includes the phrase "at least one of A, B and C" as an alternative expression that means one or more of A, B and C. In other words, the phrase "at least one of A, B, and C" in the present disclosure means "(A), (B), (C), (A and B), (A and C), (B and C) or (A, B and C)".

Another feature of this embodiment is that the service-related information table 1 includes at least one of coupon information, tutorial charge information, printing count history information, and consumable order information. The coupon information and tutorial charge information specify benefits granted to the actual multifunction device X; the printing count history information indicates the amount of printing performed on the actual multifunction device X; and the consumable order information represents orders for consumables used in the actual multifunction device X. None of the above information includes content related to user information for users A and B. Therefore, the processor 110 does not make any of the coupon information, tutorial charge information, printing count history information, or consumable order information invisible but registers this information as is in association with the new logical device LD2. Thus, according to the present embodiment, the portion of the service-related information table 1 that is not related to user information can be reliably transferred to the new logical device LD2 without modification.

In the present embodiment, each device is configured to treat a request for a new server device ID as initialization identification information, but the present invention is not limited to this method. For example, the actual multifunction device X may simply transmit information to the data processing server 100 indicating only that the device has been initialized, without including a request for a new server device ID. In this case, a new server device ID has not been issued to the actual multifunction device X but may simply generate a temporary server device ID and perform the conceptual separation illustrated in FIG. 10. The information indicating merely that the multifunction peripheral 200 has been initialized may be determined and generated by the actual multifunction device X or may be any information as long as it enables the data processing server 100 to determine that the multifunction peripheral 200 has been initialized (e.g., reset).

The sequences of steps shown in FIGS. 5 through 10, and the like in the above description do not limit the present invention to the steps indicated therein. Steps may be added or deleted, or their order may be rearranged, without departing from the spirit and technical ideas of the invention.

The technique described in the embodiment and modifications described above may be suitably combined to be implemented.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An information processing apparatus comprising:
   a communication interface communicable with a printing device via a network, the printing device being configured to perform image formation on a printing medium; and
   a controller comprising a processor configured to manage the printing device on the basis of user information of a corresponding user,
   the controller being configured to perform:
   (a) acquiring individual information identifying the printing device;
   (b) acquiring initialization identification information used for determining whether an information initialization, which returns a specific printing device from a current state for a first user to a default state prior to being first associated with the first user, has been performed on the specific printing device identified by the individual information acquired in the (a) acquiring;
   (c) determining, on the basis of the individual information acquired in the (a) acquiring and the initialization identification information acquired in the (b) acquiring, whether the information initialization has been performed on the specific printing device along with transfer of ownership of the specific printing device from the first user to a second user; and
   (d) prohibiting, in response to determining in the (c) determining that the information initialization has been performed on the specific printing device, the second user from accessing the user information of the first user,
   wherein the controller is configured to manage the printing device by conceptually viewing the printing device as being divided into:
   a physical device based on the individual information of the printing device; and
   a logical device associated with both the physical device and service information about provision of a service related to the printing device,
   wherein the controller is configured to further perform:
   (e) registering at least one user in association with the logical device,
   wherein the individual information identifying the printing device is associated with the physical device related to the printing device, and
   wherein the (d) prohibiting comprises:
   (f) in response to determining in the (c) determining that the information initialization has been performed on the specific printing device,
   discarding an association established in advance between a first logical device and a specific physical device, the first logical device being the logical device related to the first user,
   wherein the service information for the first logical device includes at least one of:
   device printing authorization information indicative of a printing authorization granted to the specific printing device;
   printing quantity information indicative of a quantity already printed on the specific printing device; or
   consumable order information for consumables for the specific printing device, and
   the specific physical device being the physical device related to the specific printing device, and
   establishing an association between a second logical device and the specific physical device, the second logical device being the logical device related to the second user;
   (g) correcting the service information associated with the first logical device such that at least content related to the user information of the first user is made invisible in the service information associated with the first logical device; and
   (h) registering the service information corrected in the (g) correcting in association with the second logical device.

2. The information processing apparatus according to claim 1,
   wherein the printing device includes a storage unit for storing therein information, the storage unit including:

a first storage area from which information stored therein is erased by the information initialization; and a second storage area from which information stored therein is not erased even when the information initialization is performed, the second storage area storing therein the individual information, and wherein, in the (a) acquiring, the controller acquires the individual information stored in the second storage area.

3. The information processing apparatus according to claim 2, wherein, in the (b) acquiring, the controller acquires the initialization identification information generated in response to the information stored in the first storage area being erased.

4. The information processing apparatus according to claim 1, wherein the service information for the first logical device further includes at least one of:

non-free printing authorization information indicative of a non-free printing authorization that the first user has acquired by paying therefor; or free printing authorization information indicative of a free printing authorization granted to the first user free of charge, and wherein, in the (g) correcting, content related to the user information for the first user is made invisible in the at least one of the non-free printing authorization information and the free printing authorization information.

5. The information processing apparatus according to claim 1, wherein, in the (g) correcting, none of the at least one of the device printing authorization information, the printing quantity information, and the consumable order information is made invisible, and wherein, in the (h) registering, the at least one of the device printing authorization information, the printing quantity information, and the consumable order information is registered in association with the second logical device.

6. The information processing apparatus according to claim 1, wherein the initialization identification information is a request for a registration identifier that the information processing apparatus uniquely generates and assigns to the specific printing device when registering the specific printing device on the information processing apparatus.

7. The information processing apparatus according to claim 1, wherein the specific printing device returns from the current state for the first user to the default state prior to being first associated with the first user when a service agreement, permitting use of the specific printing device by the first user, expires.

8. The information processing apparatus according to claim 7, wherein a logical device identifier, identifying a logical device associated with the specific printing device, is uniquely assigned to the service agreement.

9. The information processing apparatus according to claim 1, wherein the information initialization includes erasing, from the specific printing device, personal data set by the first user of the specific printing device.

10. The information processing apparatus according to claim 1, wherein the information initialization includes a factory reset.

11. A device management method for an information processing apparatus configured to manage a printing device on the basis of user information of a corresponding user, the printing device being configured to perform image formation on a printing medium, the device management method comprising:

(a) acquiring individual information identifying the printing device;

(b) acquiring initialization identification information used for determining whether an information initialization, which returns a specific printing device from a current state for a first user to a default state prior to being first associated with the first user, has been performed on the specific printing device identified by the individual information acquired in the (a) acquiring;

(c) determining, on the basis of the individual information acquired in the (a) acquiring and the initialization identification information acquired in the (b) acquiring, whether the information initialization has been performed on the specific printing device along with transfer of ownership of the specific printing device from the first user to a second user;

(d) prohibiting, in response to determining in the (c) determining that the information initialization has been performed on the specific printing device, the second user from accessing the user information of the first user;

(e) managing the printing device by conceptually viewing the printing device as being divided into:

a physical device based on the individual information of the printing device; and a logical device associated with both the physical device and service information about provision of a service related to the printing device, (f) registering at least one user in association with the logical device, wherein the individual information identifying the printing device is associated with the physical device related to the printing device, wherein the (d) prohibiting comprises:

(g) in response to determining in the (c) determining that the information initialization has been performed on the specific printing device, discarding an association established in advance between a first logical device and a specific physical device, the first logical device being the logical device related to the first user, wherein the service information for the first logical device includes at least one of:

device printing authorization information indicative of a printing authorization granted to the specific printing device;

printing quantity information indicative of a quantity already printed on the specific printing device; or consumable order information for consumables for the specific printing device, and the specific physical device being the physical device related to the specific printing device, and establishing an association between a second logical device and the specific physical device, the second logical device being the logical device related to the second user;

(h) correcting the service information associated with the first logical device such that at least content related to the user information of the first user is made invisible in the service information associated with the first logical device; and (i) registering the service information corrected in the (h) correcting in association with the second logical device.

* * * * *